(12) United States Patent
Dern et al.

(10) Patent No.: US 8,276,021 B2
(45) Date of Patent: Sep. 25, 2012

(54) CONCURRENCY TEST EFFECTIVENESS VIA MUTATION TESTING AND DYNAMIC LOCK ELISION

(75) Inventors: Christopher William Dern, Kirkland, WA (US); Roy Patrick Tan, Redmond, WA (US); Shaun Emory Miller, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 95 days.

(21) Appl. No.: 12/642,549

(22) Filed: Dec. 18, 2009

(65) Prior Publication Data

US 2011/0154121 A1   Jun. 23, 2011

(51) Int. Cl.
*G06F 11/36* (2006.01)

(52) U.S. Cl. ............... 714/35; 714/37; 714/11; 714/12; 714/38.1; 717/124; 717/125; 717/126

(58) Field of Classification Search ............ 714/38.1, 714/37, 11, 12, 35; 717/124, 125, 126
See application file for complete search history.

(56) References Cited

U.S. PATENT DOCUMENTS

| | | | |
|---|---|---|---|
| 5,410,648 A | 4/1995 | Pazel | |
| 5,764,989 A | 6/1998 | Gustafsson | |
| 5,958,049 A | 9/1999 | Mealey | |
| RE36,422 E | 11/1999 | Pazel | |
| 6,023,560 A | 2/2000 | Yoshida | |
| 6,043,897 A | 3/2000 | Morikawa | |
| 6,191,405 B1 | 2/2001 | Mishima | |
| 6,219,828 B1 | 4/2001 | Lee | |
| 6,433,896 B1 | 8/2002 | Ueda | |
| 6,484,276 B1 | 11/2002 | Singh | |
| 6,560,720 B1 | 5/2003 | Chirashnya | |
| 6,633,404 B1 | 10/2003 | Atsumi | |
| 6,897,582 B2 | 5/2005 | Hoppe | |
| 6,996,809 B2 | 2/2006 | Muhlestein | |
| 7,000,225 B2 | 2/2006 | Sangavarapu | |
| 7,120,762 B2 | 10/2006 | Rajwar | |
| 7,185,232 B1 | 2/2007 | Leavy | |
| 2003/0130831 A1* | 7/2003 | Adir | 703/22 |
| 2003/0208351 A1* | 11/2003 | Hartman et al. | 703/22 |
| 2004/0133409 A1* | 7/2004 | Mukherjee et al. | 703/14 |
| 2005/0081019 A1* | 4/2005 | DeWitt et al. | 712/227 |
| 2005/0097399 A1* | 5/2005 | Bliss et al. | 714/38 |
| 2005/0273659 A1* | 12/2005 | Shaw | 714/25 |

(Continued)

OTHER PUBLICATIONS

Bieman, et al.—Using Fault Injection to Increase Software Test Coverage—Published Date: 1996 http://www.cs.colostate.edu/~bieman/Pubs/issre96preprint.pdf.

(Continued)

*Primary Examiner* — Chae Ko
(74) *Attorney, Agent, or Firm* — Workman Nydegger

(57) ABSTRACT

One embodiment described herein is directed to a method practiced in a computing environment. The method includes acts for determining test suite effectiveness for testing for concurrency problems and/or product faults. The method includes identifying a plurality of synchronization primitives in a section of implementation source code. One or more of the synchronization primitives are iteratively modified and a same test suite is run for each iteration. For each iteration, a determination is made whether or not the test suite returns an error as a result of modifying one or more synchronization primitives. When the test suite does not return an error, the method includes providing to a user an indication which indicates at least one of a test adequacy hole for the test suite; an implementation source code fault; or an equivalent mutant of the implementation source code.

20 Claims, 3 Drawing Sheets

U.S. PATENT DOCUMENTS

| | | | | |
|---|---|---|---|---|
| 2006/0136783 | A1* | 6/2006 | Craske et al. | 714/38 |
| 2007/0143093 | A1* | 6/2007 | Alvey et al. | 703/22 |
| 2007/0180430 | A1* | 8/2007 | Farchi et al. | 717/126 |
| 2007/0220493 | A1* | 9/2007 | Morizawa | 717/126 |
| 2008/0155328 | A1* | 6/2008 | Chakraborty | 714/32 |
| 2008/0215925 | A1* | 9/2008 | Degenaro et al. | 714/41 |
| 2009/0125887 | A1* | 5/2009 | Kahlon et al. | 717/126 |
| 2009/0328028 | A1* | 12/2009 | O'Rourke et al. | 717/173 |
| 2010/0250809 | A1* | 9/2010 | Ramesh et al. | 710/200 |
| 2010/0287539 | A1* | 11/2010 | Park et al. | 717/130 |
| 2011/0099554 | A1* | 4/2011 | Shafi | 718/108 |
| 2011/0131550 | A1* | 6/2011 | Burckhardt et al. | 717/124 |

OTHER PUBLICATIONS

Rajwar, et al.—Speculative Lock Elision: Enabling Highly Concurrent Multithreaded Execution—Published Date: 2001 http://pages.cs.wisc.edu/~rajwar/papers/micro01.pdf.

Hutchins, et al.—Experiments on the Effectiveness of Dataflow— and Controlflow-Based Test Adequacy Criteria—Published Date: May 21, 1994, http://ieeexplore.ieee.org/stamp/stamp.jsp?arnumber=296778&isnumber=7343.

Yoon, et al.—Effective test case selection for component customization and its application to Enterprise JavaBeans—Published Date: Mar. 29, 2001 http://www3.interscience.wiley.com/journal/106571504/abstract?CRETRY=1&SRETRY=0.

Javascript Handbook, Danny Goodman, Apr. 22, 1996, p. 368, How Debuggers Work Algorithms, Data Structures, and Architecture, Jonathan B. Rosenberg, 1996, Whole Book.

"Managed Code Application Development for Windows Embedded Platforms", Mar. 4, 2003, retrieved from http://msdn.microsoft.com/chats/embedded/embedded_020603.asp pp. 1-8.

"What is TestCanter?" (1995), pp. 2-16.

U.S. Appl. No. 10/700,180, Jul. 26, 2006, Office action.

U.S. Appl. No. 10/700,180, Sep. 21, 2006, Notice of Allowance.

U.S. Appl. No. 10/700,180, Dec. 5, 2006, Notice of Allowance.

\* cited by examiner

CONCURRENCY TEST EFFECTIVENESS VIA MUTATION TESTING AND DYNAMIC LOCK ELISION

BACKGROUND

Background and Relevant Art

Computers and computing systems have affected nearly every aspect of modern living. Computers are generally involved in work, recreation, healthcare, transportation, entertainment, household management, etc.

Previously, the majority of computing systems were single processor/single thread systems. To test these systems, sequential test suites could be run on code to determine where faults occurred in the code.

Presently, many systems have concurrency issues in that the threads use multiple cores and/or multiple processors and/or multiple threads. These so-called multi-thread systems facilitate thread collaboration to accomplish a computing task.

Similar to single thread systems, test suites exist to test these multi-thread systems, but the testing discipline has few metrics today that address the effectiveness of a given test suite, and in particular a given test suite with respect to concurrency issues. That is to say, how effective a test is in finding faults.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein is directed to a method practiced in a computing environment. The method includes acts for determining test suite effectiveness for testing for concurrency problems and/or product faults. The method includes identifying a plurality of synchronization primitives in a section of implementation source code. One or more of the synchronization primitives are iteratively modified and a same test suite is run for each iteration. For each iteration, a determination is made whether or not the test suite returns an error as a result of modifying one or more synchronization primitives. When the test suite does not return an error, the method includes providing to a user an indication which indicates at least one of a test adequacy hole for the test suite; an implementation source code fault; or an equivalent mutant of the implementation source code.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
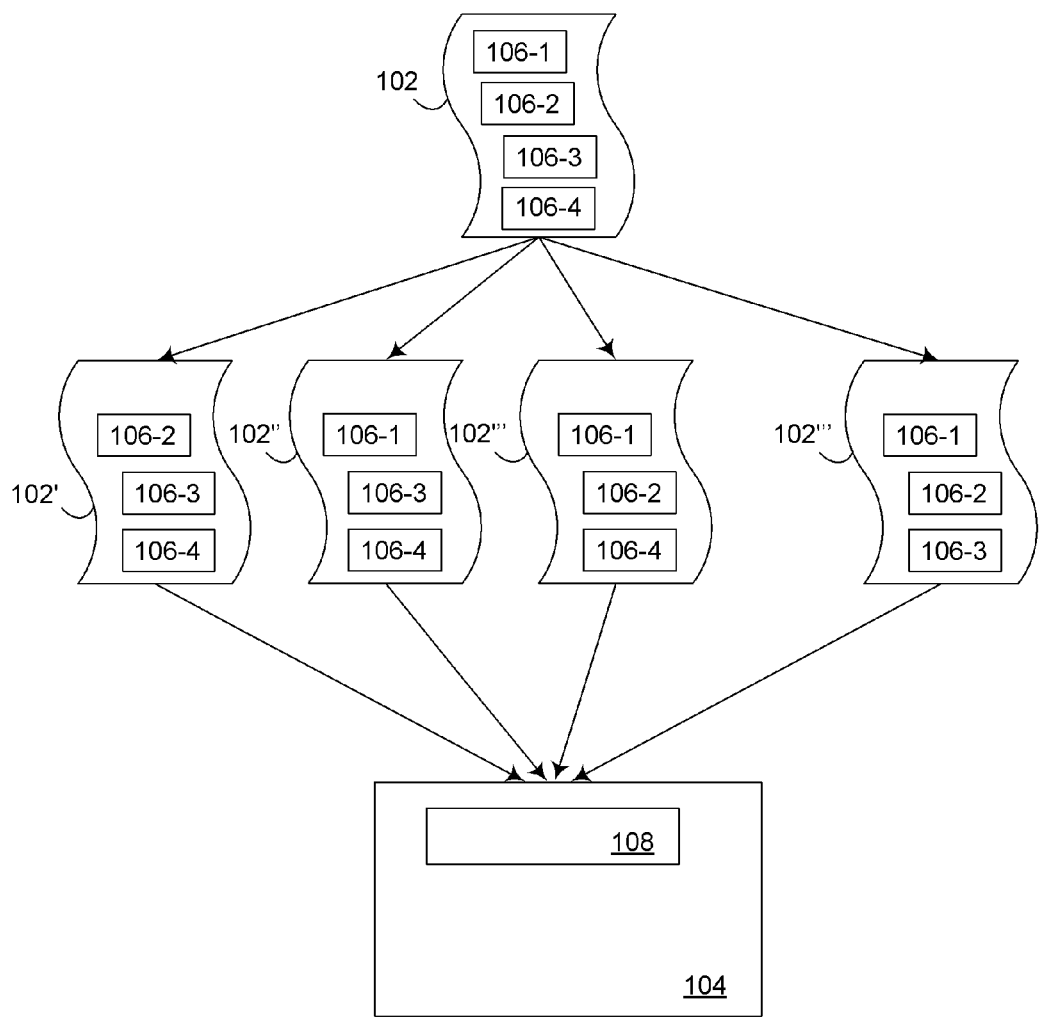
FIG. 1 illustrates testing a test suite using iterations of source code.

Some embodiments described herein are directed to determining test suite effectiveness for testing for concurrency problems. Embodiments may additionally and/or alternatively include functionality for determining that product faults exist in implementation source code.

Embodiments may use a section of implementation source code to test the effectiveness of a test suite. The source code may include a number of synchronization primitives. Various synchronization primitives such as locks, barriers, semaphores, mutexes, etc. can be used to coordinate actions between different threads. The synchronization primitives prevent, or reduce the occurrence of collisions and errors as different threads attempt to access the same memory locations. For example, a semaphore can be used to limit the number of threads that can access a given memory location. When a thread desires to access the memory location, it submits a request to access the memory location. A semaphore can be used as a counter to determine the number of threads that have already been authorized to access the memory location. If the limit of threads has not been reached, the semaphore allows access to the thread and increments the semaphore count. As threads release the memory location, the semaphore count is decremented. If the limit has been reached, the semaphore blocks further access from other threads. A mutex is a semaphore that only allows access to a single thread at a given time. A barrier prevents threads from accessing a memory location until a predetermined number of threads request access to the memory location. Once the predetermined number of threads request access, then the threads are all allowed to access the memory location.

Embodiments may include identifying a plurality of synchronization primitives in a section of implementation source code. In particular, semaphores, mutexes, barriers, and the like may be identified in the source code. The source code may be iteratively modified to modify one or more of the synchronization primitives. For example, the source code may be decompiled and one or more synchronization primitives may be removed or disabled. Alternatively, the predetermined number of threads allowed or blocked for a given primitive may be altered. The source code may then be recompiled, after which a test suite for which effectiveness is being tested may be run. These steps may be repeated for each iteration modifying one or more synchronization primitives.

For each iteration, a determination can be made whether or not the test suite returns an error as a result of modifying one or more synchronization primitives. Because an intentional fault has been injected into the source code, the expected result is that the test suite being tested for effectiveness should return an error. When the test suite does not return an error, this is an indication that indicates at least one of a test adequacy hole for the test suite; an implementation source code fault; or an equivalent mutant of the implementation source code.

Embodiments may combine mutation testing techniques with code rewriting to produce instrumented product code and to produce a map that identifies specific locks. The test suite can be run against this modified product code, specifying a number of locks to 'remove' or elide. During this test pass, the 'passed' tests can be interpreted as a hole in the test cases ability to detect the injected elided fault.

Referring now to FIG. 1, an example is illustrated. FIG. 1 illustrates a section of implementation source code 102. The implementation source code 102 may be a computer application or module programmed for use with multi-thread computer systems, such as multi-thread computer system 104 illustrated in FIG. 1. In particular, the implementation source code may include synchronization primitives. In the illustrated example, the implementation source code 102 includes four synchronization primitives 106-1, 106-2, 106-3 and 106-4.

FIG. 1 illustrates that the implementation source code 102 may be iteratively modified to modified instances of the implementation source code 102. For example, as illustrated, four iterations of the implementation source code have been created 102', 102'', 102''', 102''''. Iterations as used herein do not necessarily include a time component. For example, iteration 102' does not necessarily need to be created and tested before iteration 102''. Rather the iterations can be created and tested in any time order or simultaneously. In the example illustrated, each iteration removes or disables a synchronization primitive. For example iteration 102' disables or removes the synchronization primitive 106-1, iteration 102'' disables or removes the synchronization primitive 106-2, iteration 102''' disables or removes the synchronization primitive 106-3, and iteration 102'''' disables or removes the synchronization primitive 106-4. While not illustrated here, other iterations may be implemented. For example, a single iteration may remove or disable more than one synchronization primitive. In an alternative example, a single iteration may not totally remove synchronization primitives, but rather may modify synchronization primitives to raise or lower limits implemented by the original unmodified synchronization primitive.

FIG. 1 illustrates that the iterations 102', 102'', 102''', 102'''', of the source code 102 are provided to a multi-thread system 104 which is running a test suite 108. The test suite 108 includes a number of diagnostic modules which can detect various runtime problems. For example, the test suite may include a diagnostic module that detects collisions or illegal memory accesses. Ideally the test suite 108 would detect any concurrency problems. Ordinarily, a test suite would be used to test source code 102 to determine faults in the source code. However, embodiments allow the source code 102 to be intentionally seeded with faults (e.g. the iterations 102', 102'', 102''', 102'''') so that holes in the test suite 108 can be identified. In particular, if a fault is intentionally seeded into the source code 102, and the fault is not identified by the test suite 108, a determination can be made that the test suite 108 has a hole insofar as the intentionally seeded fault is concerned.

Figure 2:
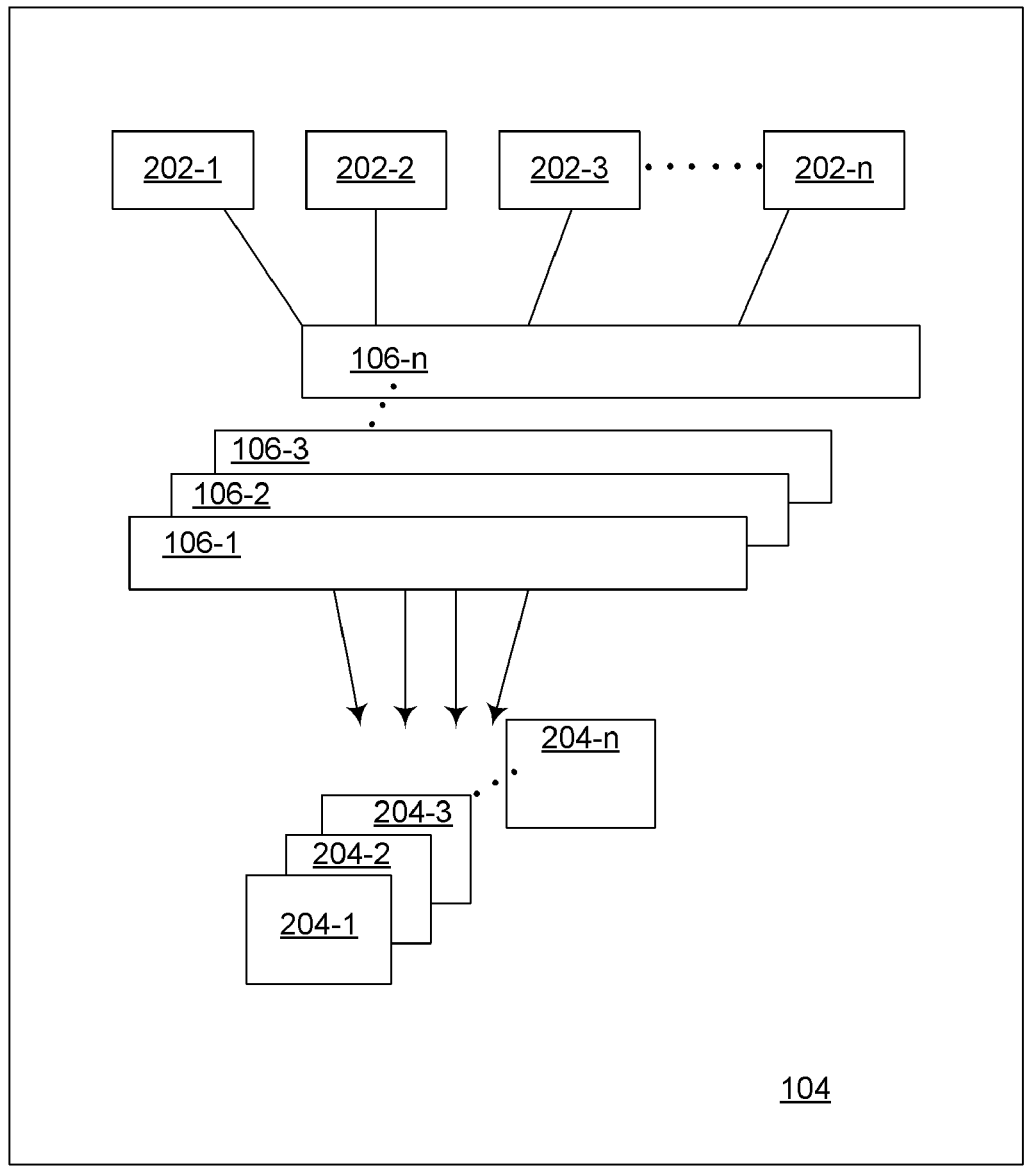
FIG. 2 illustrates a multi-thread environment where synchronization primitives can be elided to test a test suite.

FIG. 2 illustrates an example of the multi-thread system 104. In particular, FIG. 2 illustrates that the multi-thread system 104 includes a plurality of threads 202-1-202-n. Each of the threads may want to access one or more memory locations 204-1-204-n. However, a number of synchronization primitives 106-1-106-n implemented by source code 102 or an iteration of the source code 102 protect the memory locations 204. The synchronization primitives 106-1-106-n prevent, or at least reduce conflicting accesses by the threads 202-1-202-n to the memory locations 204-1-204-n.

To test a test suite 108, one or more synchronization primitives 106 may be modified including removing or disabling the primitives. The modification of the synchronization primitives 106 represents an injected fault into the source code 102. Conflicting accesses to the memory locations 204 can be detected and reported. If the conflicting accesses are detected as a result of modification of the synchronization primitives 106, then this can be a verification that a test suite hole does not exist with respect to a type of fault corresponding to the injected fault. Alternatively, if the injected fault is not detected, a test adequacy hole for the test suite; an implementation source code fault; or an equivalent mutant of the implementation source code can be identified.

Illustrating now the equivalent mutant case, an equivalent mutant is essentially an iteration of the source code, that even though synchronization primitives have been modified from the original synchronization primitives, continues to function without error caused by the modified synchronization primitives. For example, there may be cases where a semaphore specifying a maximum of five threads works equivalent to the same semaphore specifying a maximum of ten threads. Once such a particular synchronization primitive has been identified, such as for example by changing the primitive and the test suite not detecting an error, the synchronization primitive can be examined to determine if it can be modified to make a source code iteration which is an equivalent mutant of the original source code. Identifying equivalent mutants is typically only able to be done when the synchronization primitive is not completely disabled or removed.

If the synchronization primitive is completely disabled or removed and the test suite does not return an error, this is typically an indication of either a test suit adequacy hole or a source code fault. Various examples have been illustrated herein demonstrating identification of test suite adequacy holes. The test suite not returning an error when an iteration of source code is test may indicate a fault in the source code. In particular, a synchronization primitive may be included in source code but may not have any positive effective functionality in the source code. Thus the synchronization primitive may be unneeded. However, synchronization primitives are typically implemented in source code at some cost to the application at runtime. Thus, in some embodiments, unneeded synchronization primitives may represent faults that reduce the performance of an application executing the source code. Embodiments can be used to identify these unneeded primitives when an iteration removing the synchronization primitive does not result in an error from a test suite.

Embodiments herein may include dynamic concurrency fault injection at both lexical call sites for both all calls and object specific.

The instrumentation described herein can be made to work for either managed (e.g. java, .Net®, etc.) or native applications (e.g. C).

Mutation Testing is a technique, used to measure the effectiveness of a given test. A collection of errors are seeded into product code, tested with an existing test suite where a 'failure' in the test indicates it successfully detect the synthetic fault. In traditional mutation testing, the mutation/fault operations can suffer from a problem known as an equivalent mutant, as described above, where the mutated program is functionality equivalent to the original code. This results in false positive hits, and tends to result in a large amount of manual verification effort to determine if the test hole is a true hole or an equivalent mutant. Embodiments may be implemented to limit the mutations to those of lock elision in concurrent programs, removing this entire class of failures, which increases the effectiveness of this approach.

A generalized process for .Net® code of one embodiment is now illustrated. A test suite to be measured and the corresponding product code are selected. The source is instrumented, using a decompile/modify/compile approach, which for managed code uses ILAsm.exe and ILDasm.exe. For each call to System.Threading.Monitor.Enter and System.Threading.Monitor.Exit, that call is replaced with a custom version, e.g. Mutaton.Monitor.Enter. A unique identifier is also generated, for each lexical call site, and stored with the source file e.g. file and line number for later use.

The test process is now illustrated. A sync point is selected to elide. The test pass is performed. For each test 'failure', the fault or mutant is marked as found. If a test passes, it has failed to find the failure, and represents a test adequacy hole. A successful test is one that detects the fault.

Description

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Figure 3:
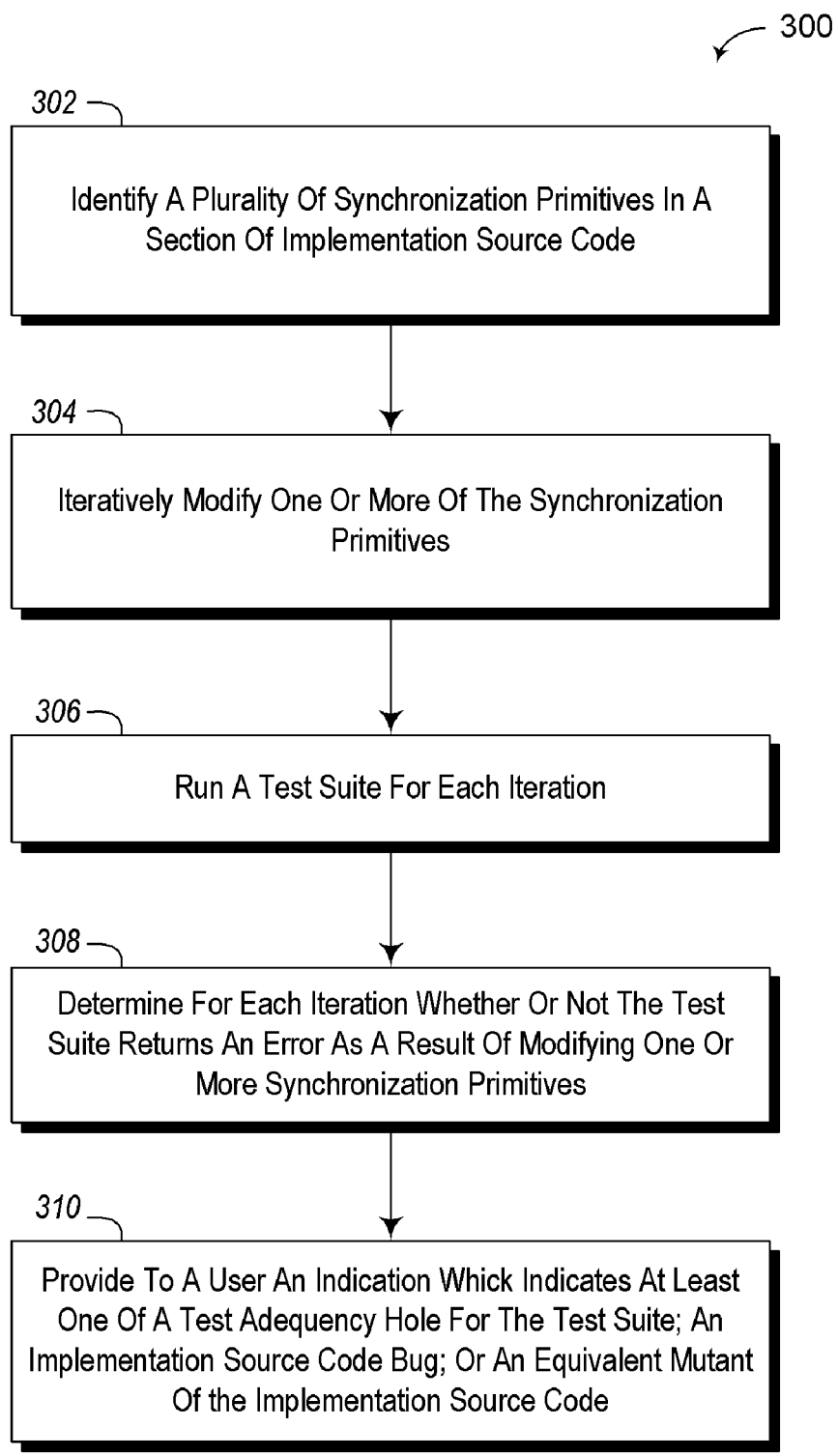
FIG. 3 illustrates a method of testing a test suite.

Referring now to FIG. 3, a method 300 is illustrated. The method 300 may be practiced in a computing environment. The method 300 includes acts for determining test suite effectiveness for testing for concurrency problems and/or product faults. The method includes identifying a plurality of synchronization primitives in a section of implementation source code (act 302). For example, code in implementation source code may be analyzed to find semaphores, barriers, mutexes, etc.

The method 300 may further include iteratively modifying one or more of the synchronization primitives (act 304). For example, a synchronization primitive, or a combination of synchronization primitives may be completely removed or disabled, or may be modified to increase or decrease allowed threads (e.g. for semaphores) or increase or decrease the number of requesting threads needed before access is allowed (e.g. for barriers). This modification takes place for a number of different instances of implementation source code iterations, each iteration modifying a different synchronization primitive or different set of synchronization primitives.

The method 300 may further include running a same test suite for each iteration (act 306). For example, a test suite is run along with each different iteration of implementation source code.

The method 300 may further include determining, for each iteration whether or not the test suite returns an error as a result of modifying one or more synchronization primitives (act 308). As noted, the expected result is that an error should be returned. However, if an error is not returned, this is a significant event that is desirable to know about. Thus, the method may further include when the test suite does not return an error, providing to a user an indication which indicates at least one of a test adequacy hole for the test suite; an implementation source code fault; or an equivalent mutant of the implementation source code (act 310).

The method 300 may be practiced where iteratively modifying one or more of the synchronization primitives includes removing or disabling one or more synchronization primitives. In this particular case, the error provided to the user indicates at least one of a test adequacies hole for the test suite, or a source code fault.

In some embodiments, the method 300 may be practiced where iteratively modifying one or more of the synchronization primitives includes removing or disabling a transition semaphore. Alternatively or additionally, iteratively modifying one or more of the synchronization primitives may include removing or disabling a barrier.

Embodiments of the method 300 may be practiced where the implementation source code is managed code or native code.

Some embodiments of the method 300 may further include, decompiling the implementation source code, whereafter the act of modifying one or more of the synchronization primitives is performed, whereafter the implementation source code, with the modifications, is recompiled, and whereafter, the act of running a same test suite is performed.

The method 300 may further include storing a unique identifier for each of the synchronization primitives in the plurality of synchronization primitives with a source code file. In some embodiments, the unique identifier includes an identification of the source code file and a line number of the synchronization primitive.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment a method of determining test suite effectiveness for detecting concurrency problems and/or product faults within implementation source code, the method comprising:
    identifying a plurality of synchronization primitives in a section of implementation source code, wherein there is a test suite which is intended to test the section of implementation source code;
    iteratively modifying one or more of the synchronization primitives in the implementation source code;
    for each iteration of modifying one or more of the synchronization primitives in the implementation source code, running the test suite to determine if the test suite detects an error caused as a result of modifying the one or more synchronization primitives in the implementation source code;
    determining, for each iteration whether or not the test suite returns an error as a result of modifying one or more synchronization primitives in the implementation source code; and
    when the test suite does not return an error, providing to a user an indication which indicates at least one of a test adequacy hole for the test suite, an implementation source code fault, or an equivalent mutant of the implementation source code in order to verify the effectiveness of the test suite for detecting concurrency problems and/or product faults within implementation source code.

2. The method of claim 1, wherein iteratively modifying one or more of the synchronization primitives comprises removing or disabling one or more synchronization primitives, and wherein the error provided to the user indicates at least one of a test adequacies hole for the test suite; or a source code fault.

3. The method of claim 1, wherein iteratively modifying one or more of the synchronization primitives comprises removing or disabling a transition semaphore.

4. The method of claim 1, wherein iteratively modifying one or more of the synchronization primitives comprises removing or disabling a barrier.

5. The method of claim 1, wherein the implementation source code is managed code.

6. The method of claim 1, wherein the implementation source code is native code.

7. The method of claim 1, further comprising:
    decompiling the implementation source code;
    whereafter the act of modifying one or more of the synchronization primitives is performed;
    whereafter the implementation source code, with the modifications, is recompiled; and
    whereafter, the act of running a same test suite is performed.

8. The method of claim 1, further comprising storing a unique identifier for each of the synchronization primitives in the plurality of synchronization primitives with a source code file.

9. The method of claim 8, wherein the unique identifier comprises an identification of the source code file and a line number of the synchronization primitive.

10. A computer program product comprising physical storage media comprising computer executable instructions that when executed by one or more processors cause the one or more processors to perform the following:
    identifying a plurality of synchronization primitives in a section of implementation source code, wherein there is a test suite which is intended to test the section of implementation source code;
    iteratively modifying one or more of the synchronization primitives;
    for each iteration of modifying one or more of the synchronization primitives in the implementation source code, running the test suite to determine if the test suite detects an error caused as a result of modifying the one or more synchronization primitives in the implementation source code;
    determining, for each iteration whether or not the test suite returns an error as a result of modifying one or more synchronization primitives; and
    when the test suite does not return an error, providing to a user an indication which indicates at least one of a test adequacy hole for the test suite, an implementation source code fault, or an equivalent mutant of the implementation source code in order to verify the effectiveness of the test suite for detecting concurrency problems and/or product faults within implementation source code.

11. The computer program product of claim 10, wherein iteratively modifying one or more of the synchronization primitives comprises removing or disabling one or more synchronization primitives, and wherein the error provided to the user indicates at least one of a test adequacies hole for the test suite; or a source code fault.

12. The computer program product of claim 10, wherein iteratively modifying one or more of the synchronization primitives comprises removing or disabling a transition semaphore.

13. The computer program product readable medium of claim 10, wherein iteratively modifying one or more of the synchronization primitives comprises removing or disabling a barrier.

14. The computer program product of claim 10, wherein the implementation source code is managed code.

15. The computer program product of claim 10, wherein the implementation source code is native code.

16. The computer program product of claim 10, further comprising computer executable instructions that when executed by the one or more processors cause the one or more processors to perform the following:
  decompiling the implementation source code;
  whereafter the act of modifying one or more of the synchronization primitives is performed;
  whereafter the implementation source code, with the modifications, is recompiled; and
  whereafter, the act of running a same test suite is performed.

17. The computer program product of claim 10, further comprising computer executable instructions that when executed by one or more processors cause the one or more processors to store a unique identifier for each of the synchronization primitives in the plurality of synchronization primitives with a source code file.

18. The computer program product of claim 17, wherein the unique identifier comprises an identification of the source code file and a line number of the synchronization primitive.

19. A computer system comprising one or more processors and one or more computer memory comprising computer executable instructions that when executed by the one or more processors cause the one or more processors to perform the following:
  identifying a plurality of synchronization primitives in a section of implementation source code, wherein there is a test suite which is intended to test the section of implementation source code;
  iteratively modifying one or more of the synchronization primitives by removing or disabling one or more synchronization primitives;
  for each iteration of modifying one or more of the synchronization primitives in the implementation source code, running the test suite to determine if the test suite detects an error caused as a result of modifying the one or more synchronization primitives in the implementation source code;
  determining, for each iteration whether or not the test suite returns an error as a result of modifying one or more synchronization primitives; and
  when the test suite does not return an error, providing to a user an indication which indicates at least one of a test adequacy hole for the test suite or an implementation source code fault in order to verify the effectiveness of the test suite for detecting concurrency problems and/or product faults within implementation source code.

20. The system of claim 19, the memory further comprising computer executable instructions stored thereon that when executed by one or more processors cause the one or more processors to store a unique identifier for each of the synchronization primitives in the plurality of synchronization primitives with a source code file.

* * * * *